(12) United States Patent
Drieu et al.

(10) Patent No.: US 10,589,876 B2
(45) Date of Patent: Mar. 17, 2020

(54) APPARATUS FOR SUPPORTING A NACELLE OF AN AIRCRAFT ENGINE

(71) Applicant: SAFRAN NACELLES, Gonfreville L'Orcher (FR)

(72) Inventors: Thierry Drieu, Gonfreville L'Orcher (FR); Patrice Chantal, Gonfreville L'Orcher (FR); Anthony Damour, Gonfreville L'Orcher (FR); Stéphane Labazee, Gonfreville L'Orcher (FR)

(73) Assignee: SAFRAN NACELLES, Gonfreville L'Orcher (FR)

( * ) Notice: Subject to any disclaimer, the term of this patent is extended or adjusted under 35 U.S.C. 154(b) by 42 days.

(21) Appl. No.: 15/635,515

(22) Filed: Jun. 28, 2017

(65) Prior Publication Data

US 2017/0297744 A1    Oct. 19, 2017

Related U.S. Application Data

(63) Continuation of application No. PCT/FR2015/053729, filed on Dec. 22, 2015.

(30) Foreign Application Priority Data

Dec. 29, 2014    (FR) ..................................... 14 63396

(51) Int. Cl.
*B64F 5/50*    (2017.01)
*B05C 13/02*    (2006.01)
*B64D 27/16*    (2006.01)

(52) U.S. Cl.
CPC ................ *B64F 5/50* (2017.01); *B05C 13/02* (2013.01); *B64D 27/16* (2013.01)

(58) Field of Classification Search
USPC .................................. 248/554, 544; 29/889.1
See application file for complete search history.

(56) References Cited

U.S. PATENT DOCUMENTS

| 2,849,124 | A  | * | 8/1958  | Warner  | B66C 23/48 |
|-----------|-----|---|---------|---------|------------|
|           |     |   |         |         | 414/728    |
| 2012/0317799 | A1 | * | 12/2012 | Selby | B66F 19/005 |
|           |     |   |         |         | 29/822     |
| 2014/0124043 | A1 | * | 5/2014  | Helmin | F16L 55/1705 |
|           |     |   |         |         | 137/15.08  |
| 2015/0113787 | A1 | * | 4/2015  | Holay | F01D 25/285 |
|           |     |   |         |         | 29/467     |

FOREIGN PATENT DOCUMENTS

| BE | 560669    | 9/1957  |
| FR | 2848200   | 6/2004  |
| FR | 2992292   | 12/2013 |
| JP | 2002193195 | 7/2002  |

OTHER PUBLICATIONS

FP 2848200 English Machine Translation, attached as pdf.*
Concave Manway Cover, Sep. 2018, found at https://www.gwkent.com/manhole-cover-2.html, attached as pdf.*
International Search Report for International Application PCT/FR2015/053729, dated Nov. 3, 2016.

* cited by examiner

*Primary Examiner* — Brian D Keller
(74) *Attorney, Agent, or Firm* — Burris Law, PLLC

(57) ABSTRACT

Apparatus for supporting a nacelle of an aircraft engine is provided by the present disclosure. In one form, the apparatus includes a frame, a supporting structure extending from the frame, and a structure for attaching a nacelle, which is rotatably mounted on the supporting structure and can be rotated about a substantially horizontal axis.

18 Claims, 5 Drawing Sheets

APPARATUS FOR SUPPORTING A NACELLE OF AN AIRCRAFT ENGINE

CROSS-REFERENCE TO RELATED APPLICATIONS

This application is a continuation of International Application No. PCT/FR2015/053729, filed on Dec. 22, 2015, which claims priority to and the benefit of FR 14/63396 filed on Dec. 29, 2014. The disclosures of the above applications are incorporated herein by reference.

FIELD

The present disclosure relates to a handling assembly of an aircraft motor nacelle, such as a turbojet engine.

BACKGROUND

The statements in this section merely provide background information related to the present disclosure and may not constitute prior art.

An aircraft is driven by one or more propulsion unit(s), each comprising a turbojet engine housed in a nacelle.

The modern nacelles are intended to accommodate a bypass turbojet engine, adapted to generate a hot gas flow (also called primary flow), coming from the combustion chamber of the turbojet engine, and a cold air flow (also called secondary flow), generated by the blades of the fan of the turbojet engine and circulating outside the turbojet engine through an annular passage (also called flow path) formed between a fairing of the turbojet engine (or an inner structure of the nacelle surrounding the turbojet engine) and an inner wall of the nacelle. The primary and secondary flows are ejected from the turbojet engine from the rear of the nacelle.

A nacelle has a tubular structure usually comprising an air inlet in front of the turbojet engine, a middle section intended to surround the fan of the turbojet engine, and a rear section, the rear section generally accommodating thrust reversal means and being intended to surround the combustion chamber of the turbojet engine. Furthermore, the nacelle is generally terminated by an ejection nozzle whose outlet is located downstream of the turbojet engine.

The rear section of the nacelle is usually formed of a first and a second half-shells of a substantially semi-cylindrical shape, disposed on either side of a longitudinal vertical symmetry plane of the nacelle. The middle and rear sections are, conventionally, connected to one another by a frame, the first and second half-shells being generally equipped with positioning means cooperating in the working position with complementary positioning means formed on the frame.

Given the size, weight and relative fragility of the members constituting a nacelle, the finishing, final assembly and handling operations are complex, time consuming and involve expensive equipment.

The finishing operations comprise, in particular, the painting operations, which are important for the final quality of the external appearance. However, these operations do not seem to be currently optimized in terms of quality and speed of execution.

Conventionally, the painting operations of a nacelle are performed by means of support carriages dedicated to the different subassemblies of a nacelle, namely the air inlet, the two half-portions forming the middle section and the two half-portions forming the rear section. Each of these members is thus fastened on a corresponding support carriage to be painted by an operator. Examples of these known devices are represented in FIGS. 1 and 2. FIG. 1 shows a painting tooling 100 for a nacelle air inlet 101. FIG. 2 shows a painting tooling 200 for a nacelle rear half-section 201.

This conventional method has several drawbacks. Firstly, it involves a significant number of specific equipment, including not less than five different support carriages for a single nacelle. Furthermore, for the most voluminous members, the operators are forced, in order to access all the areas to be painted, to use platforms of different heights, thereby implying for the operators a highly degraded ergonomics.

Different operations subsequent to the painting operations are also impacted by bad ergonomics and efficiency.

Indeed, once the painting operations are completed, the nacelle is equipped and mounted on a motor, said "slave motor", in order to perform the last quality control (including, in particular, a dimensional control). Therefore, this implies having to handle each of the subassemblies of the nacelle in order to mount them on the slave motor, with the risks and the difficulties it includes. Then the nacelle is presented to the customer mounted on the slave motor, so that the customer may perform the controls and decide whether to accept or not the delivery of this nacelle. Finally, the nacelle is detached and the subassemblies are installed on specific transport carriages to be delivered to the customer. Handling operations are therefore performed on several occasions.

At each step of this process, the handling of the members constituting the nacelle is an important operation because the nacelles are very heavy parts and of very large dimensions, but relatively fragile. Generally, the precautions for the handling of the nacelle members are time-consuming.

SUMMARY

The present disclosure provides tooling for supporting a nacelle of an aircraft turbojet engine, including:
  a chassis;
  a support structure rising from the chassis; and
  a hooking structure of a nacelle, rotatably mounted on the support structure and movable in rotation about a substantially horizontal axis.

Thus, by providing for a single tooling allowing fastening all the members of a nacelle, in their normal operating position, the entire nacelle may be painted in a single painting operation, which represents a great savings of time and improved quality, in particular for painting logos of the type called through-type. In addition, thanks to the rotating character of the tooling, substantially all portions of the nacelle may be easily reached by a ground operator. Furthermore, each member of the nacelle being fastened to the tooling in the same way it would be, in real condition, fastened to a turbojet engine, the tooling allows carrying out the final assembly and finishing operations of the nacelle on the motor, as for example the qualitative control. Finally, the displacement of the thus mounted nacelle may be directly provided, without having to conduct additional handling operations.

In one form, the hooking structure is configured to allow the fastening of all the members constituting a nacelle on the tooling, in a manner similar to the normal fastening of these members on an aircraft.

In another form, the hooking structure includes a device for fastening an air inlet of a nacelle.

In another form, the hooking structure includes a device for fastening a middle section of a nacelle.

In still another form, the hooking structure includes a device for fastening a rear section of a nacelle.

In other forms, the tooling includes a first segment, intended to carry the rear section of a nacelle, and a second segment, intended to carry the median section and the air inlet of a nacelle, the second segment being movable in translation relative to the first section, in a direction parallel to the axis of rotation of the hooking structure.

In another form, the chassis is equipped with devices allowing the displacement thereof, such as retractable rollers or air bags.

In yet another form, the tooling includes a device for rotatably driving the hooking structure, such as an electric motor.

In still another form, the tooling includes a device, in particular an electrical device, allowing varying the height of the hooking structure.

The present disclosure also concerns an assembly of a nacelle and a tooling such as defined above.

In one form, the nacelle includes a front section, a middle section and a rear section.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3b is a side view of the tooling and nacelle of FIG. 3a;

FIG. 4b is a perspective view of the tooling of FIG. 4a;

FIG. 5b is a rear perspective view of the hooking structure of FIG. 5a;

FIG. 6a is a side view illustrating a variant of the tooling of FIG. 3a; and

FIG. 6b is a top view illustrating the tooling of FIG. 6a.

Figure 1:
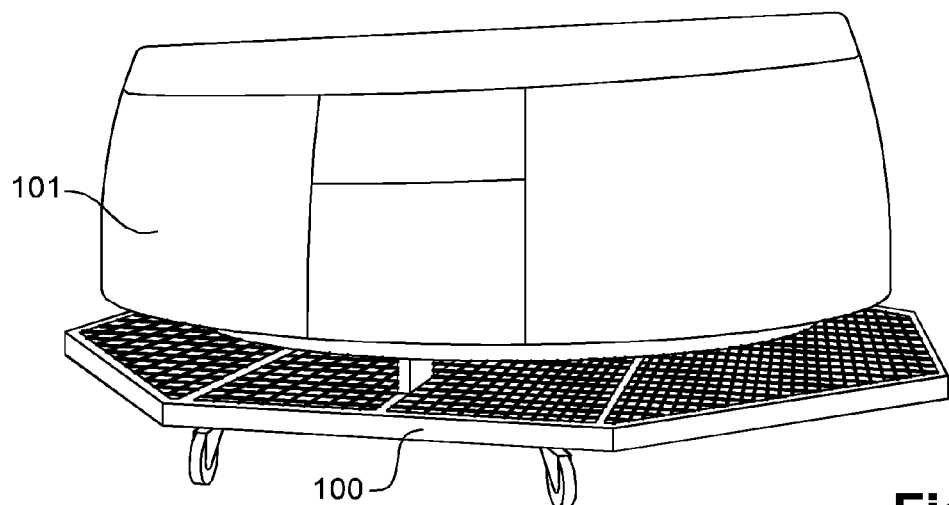
FIGS. 1 and 2 represent known tooling according to the prior art.
Figure 2:
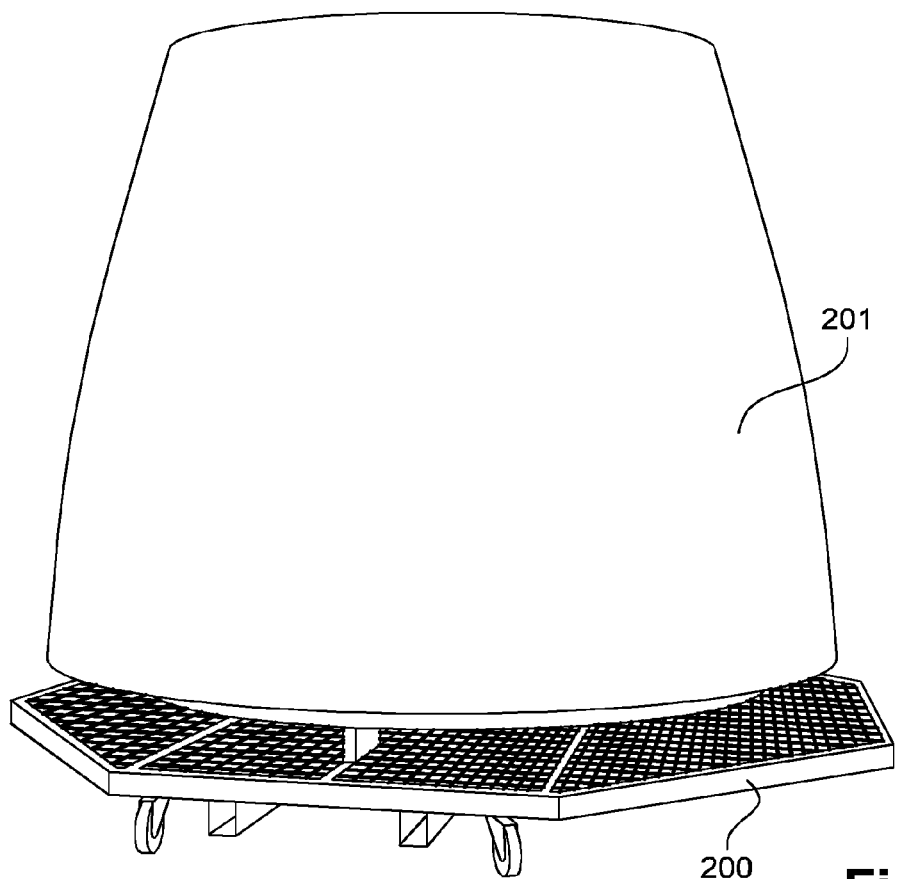

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3A:
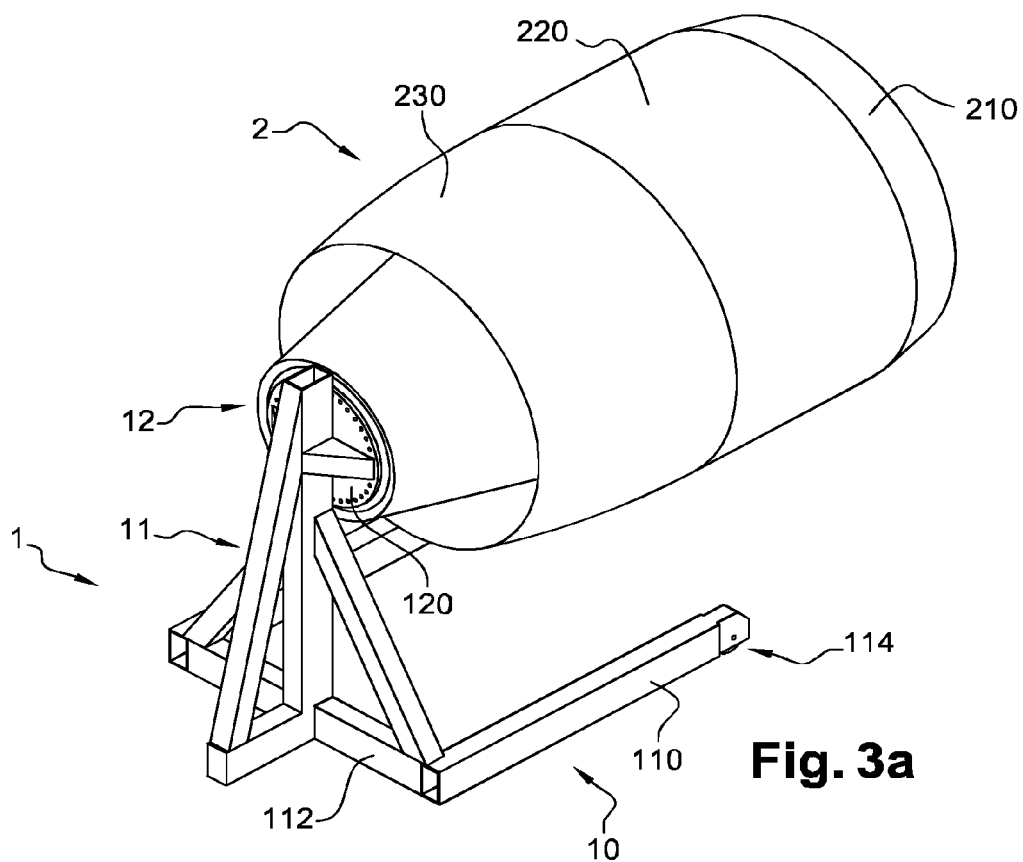
FIG. 3a is a perspective view of tooling in accordance with the present disclosure, on which a turbojet engine nacelle is assembled.
Figure 3B:
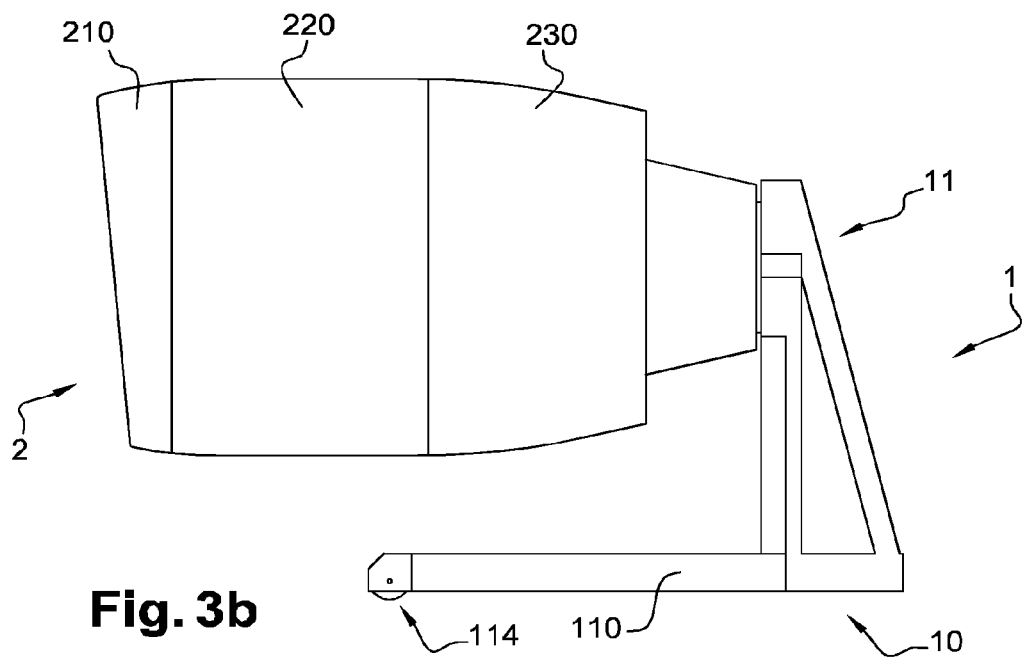

FIGS. 3a and 3b represent an example of one form of tooling 1 in accordance with the present disclosure, this tooling 1 allowing supporting the entirety of a turbojet engine nacelle 2. In the example of FIGS. 3a and 3b, the nacelle 2 is a bypass turbojet engine nacelle. In the example, the nacelle 2 generally comprises three subassemblies:

a front section 210, or air inlet;
a middle section 220; and
a rear section 230.

According to the present disclosure, the tooling 1 is shaped so as to allow the fastening of each of these three subassemblies on the tooling 1, in a manner identical to the fastening thereof on an aircraft under normal operating conditions, that is to say in a manner identical to the normal fastening thereof on the turbojet engine and/or on the motor pylon of an aircraft.

The tooling 1 includes a horizontal chassis 10 which supports a vertical structure 11. The vertical structure 11 carries at its upper end a hooking structure 12 of a turbojet engine nacelle 2. In the example, the chassis 10 has a general U-shape, elongated in a longitudinal direction. The chassis 10 includes, in the example, two longitudinal arms 110 and a cross-member 112. In order to facilitate the displacement thereof, the chassis 10 may include devices such as retractable rollers 114.

According to the present disclosure, the hooking structure 12 is pivotally mounted on the vertical structure 11, about a substantially horizontal axis of rotation, and substantially coincident with the longitudinal axis of the nacelle 2 when said nacelle is assembled on the tooling 1. The tooling 1 includes a device 120 for rotatably driving the hooking structure 12, comprising for example an electric motor. Thus, it is possible to control the rotation of the hooking structure 12, and therefore of the nacelle 2 it supports. The finishing operations of the nacelle, in particular the painting operations, are greatly facilitated since a ground operator may access to the entire nacelle, regardless of the dimensions of said nacelle. Similarly, quality control operations are simplified since they may be carried out by a ground operator.

Figure 4A:
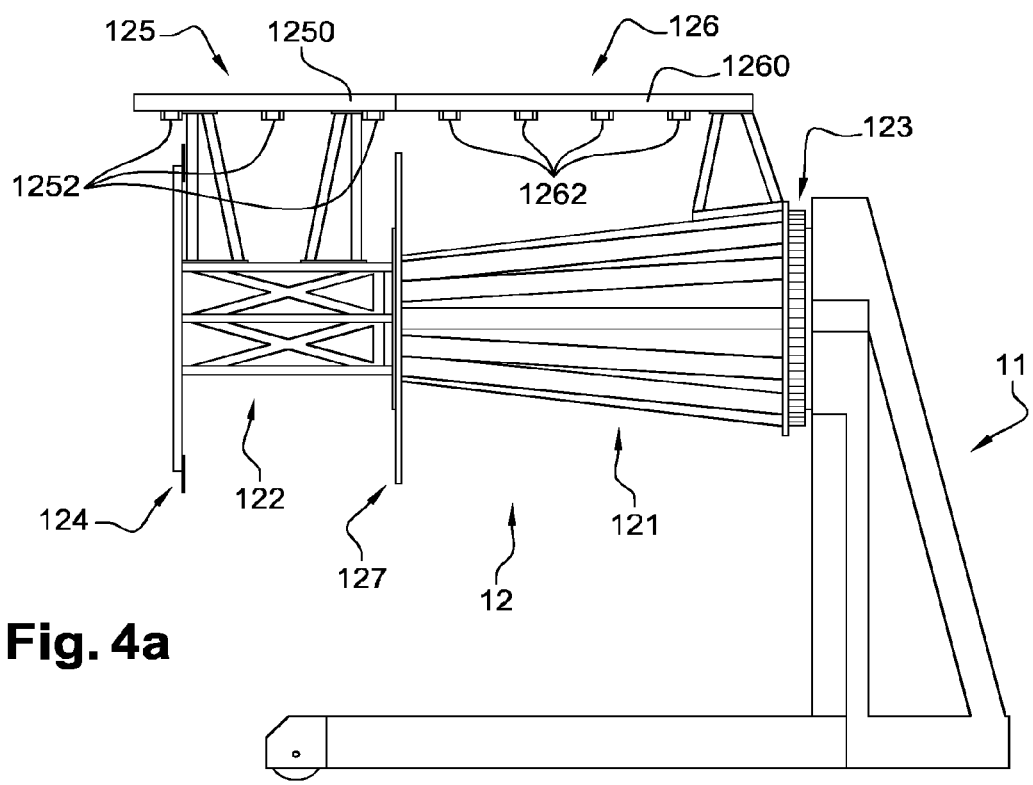
FIG. 4a is a side view of the tooling of FIG. 3a in accordance with the present disclosure.
Figure 4B:
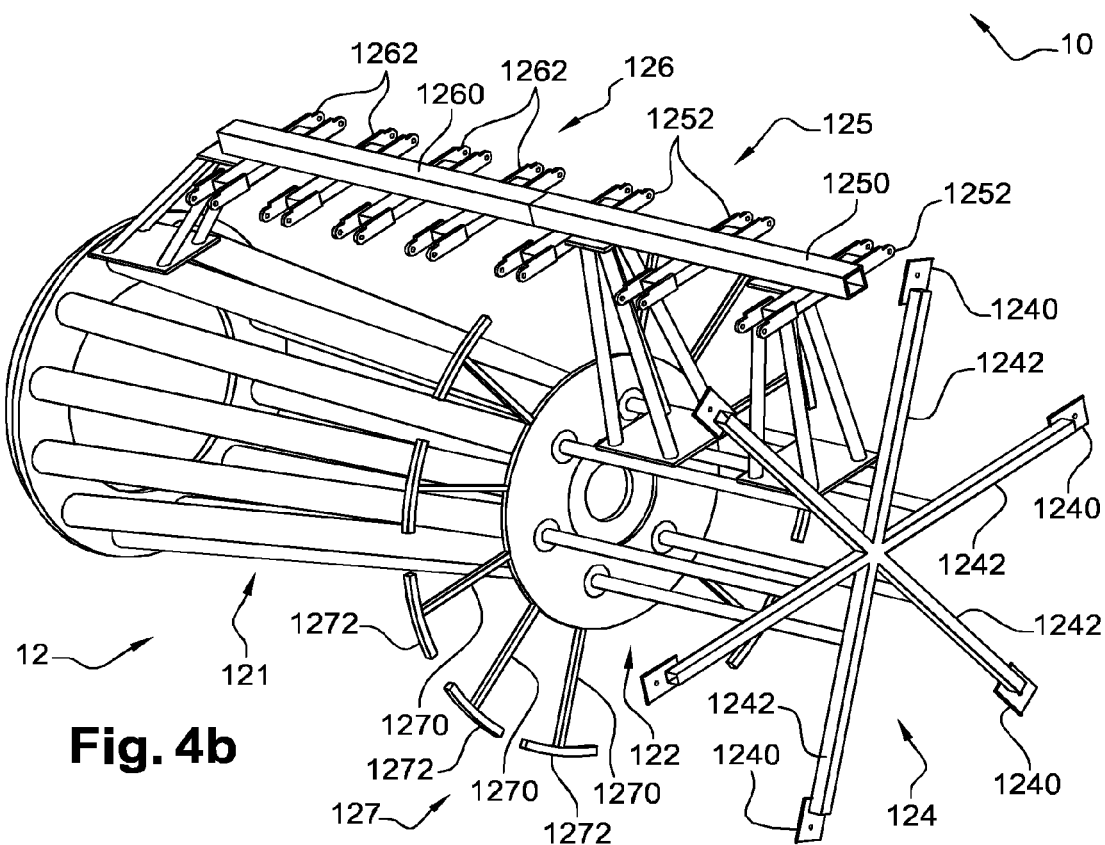

FIG. 4a shows the tooling 1 in accordance with the present disclosure, without a nacelle assembled on the hooking structure. The hooking structure comprises two main segments, a rear segment 121 and a front segment 122. The rear segment 121 is secured to the vertical structure 11 via a pivot connection. In the example of FIGS. 4a and 4b, the rear segment carries at its rear end a toothed ring 123 allowing rotatably driving the hooking structure 12. The front 122 and rear 121 segments carry the set of the devices serving to the fastening of a nacelle on the tooling 1. These fastening devices include an air inlet fastening support 124, a median section fastening support 125, and two rear section fastening supports 126, 127. The set of the devices for fastening the different portions correspond to the different fastening points provided on the turbojet engine and/or the motor pylon corresponding to the nacelle. Thus, the fastening devices 124, 125, 126, 127 are configured such that the nacelle 2 is fastened on the tooling 1 in exactly the same manner as on an aircraft in an operating condition. In particular, manipulations and movements of portions of the nacelle which are possible in real conditions may be reproduced when the nacelle is mounted on the tooling. This includes in particular the displacement and/or the opening of the different cowls of the nacelle in the maintenance position, or the opening, if necessary, of the thrust reversers.

FIG. 4b represents the hooking structure 12 of the tooling of FIG. 4a and shows the fastening devices 124, 125, 126, 127 in more detail.

The air inlet fastening support 124 forms a support for fastening the air inlet flange of the nacelle 2, this flange being located in the front section 210 of the nacelle 2. The air inlet fastening support 124 includes for this purpose fastening plates 1240, in the example six fastening plates 1240 which are each disposed at the end of an arm 1242.

The middle section fastening support 125 includes a beam 1250 on which three attachment devices 1252 are fastened, allowing the fastening, via hinges, of the members forming the median section 220 of the nacelle 2.

The first rear section fastening support 126 includes a beam 1260 on which four attachment devices 1262 are fastened allowing the fastening, via hinges, of the members forming the rear section 230 of the nacelle 2. The second rear section fastening support 127 is formed by a star-shaped structure including branches 1270 and peripheral ends 1272. The peripheral ends 1272 partially reproduce the groove of the blade/groove-type flanging system (also called "V-blade/V-groove").

The example of FIGS. 4a and 4b shows a hooking structure 12 including front 122 and rear 121 segments mainly constituted by an assembly of tubular beams.

Figure 5A:
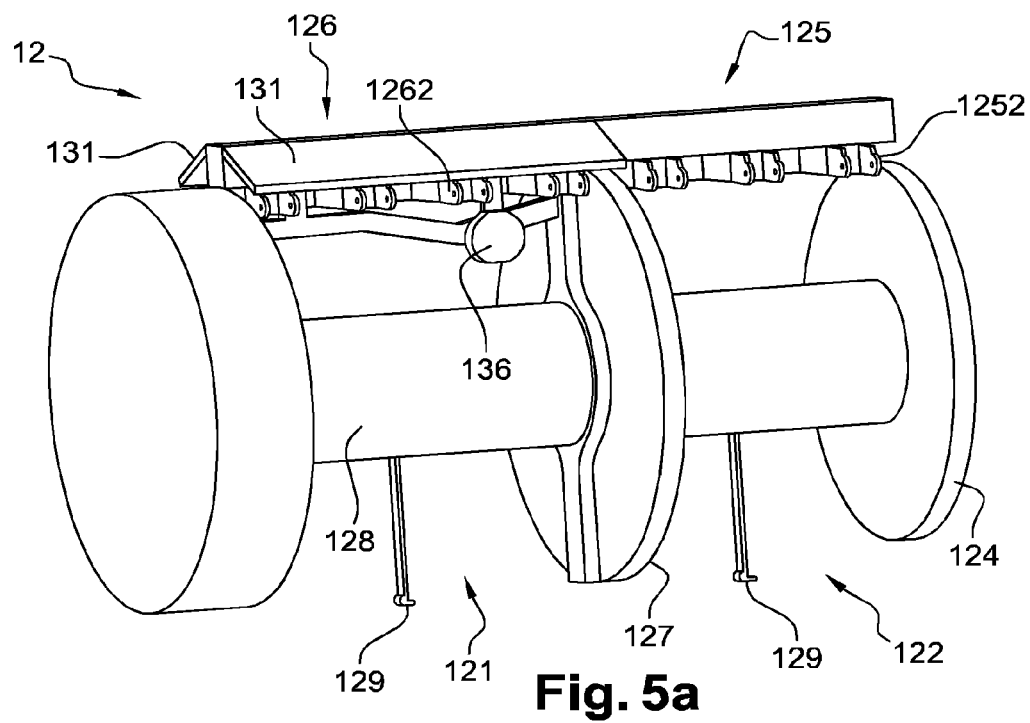
FIG. 5a is a front perspective view illustrating a variant of a hooking structure of the nacelle according to the present disclosure.
Figure 5B:
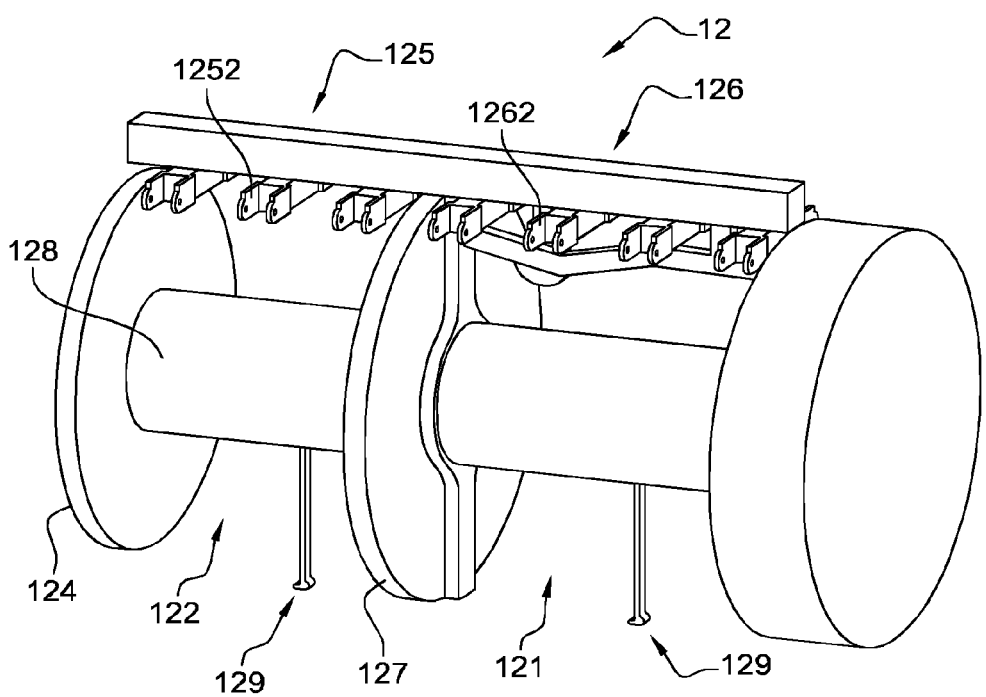

The example shown in FIGS. 5a and 5b shows that the hooking structure may be made in different manners, as long as the different hooking points of the nacelle are present and correctly positioned. In this example, it is can be seen that the front 122 and rear 121 segments form a single tubular structure 128. This tubular structure 128 carries the different fastening devices 124, 125, 126, 127.

In the example shown in FIGS. 5a and 5b, additional members are further represented, which are of course compatible with the various forms of the present disclosure. These members are drainage systems 129 (also called "drain masts"), one or several damping and stopping devices 130 (also called "bumpers"). Furthermore, FIG. 5a shows that the rear segment 121 is provided at its top end with panels 131 corresponding to access hatches of a nacelle called "hinge access panels." These panels 131 are detachable and may also equip the front segment 122.

Figure 6A:
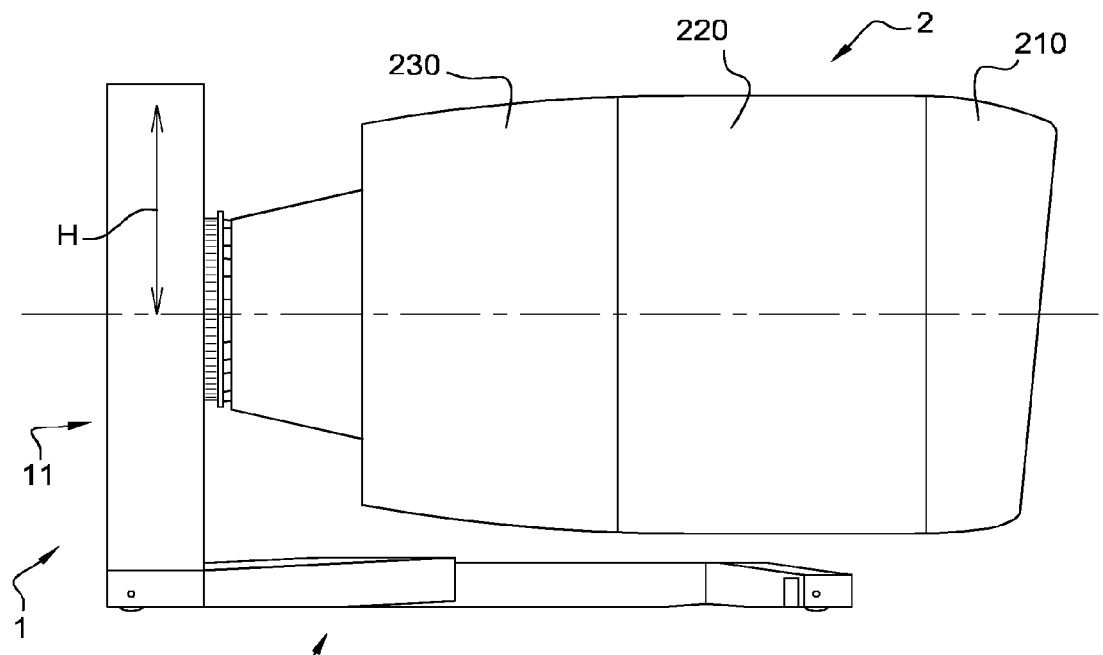
Figure 6B:
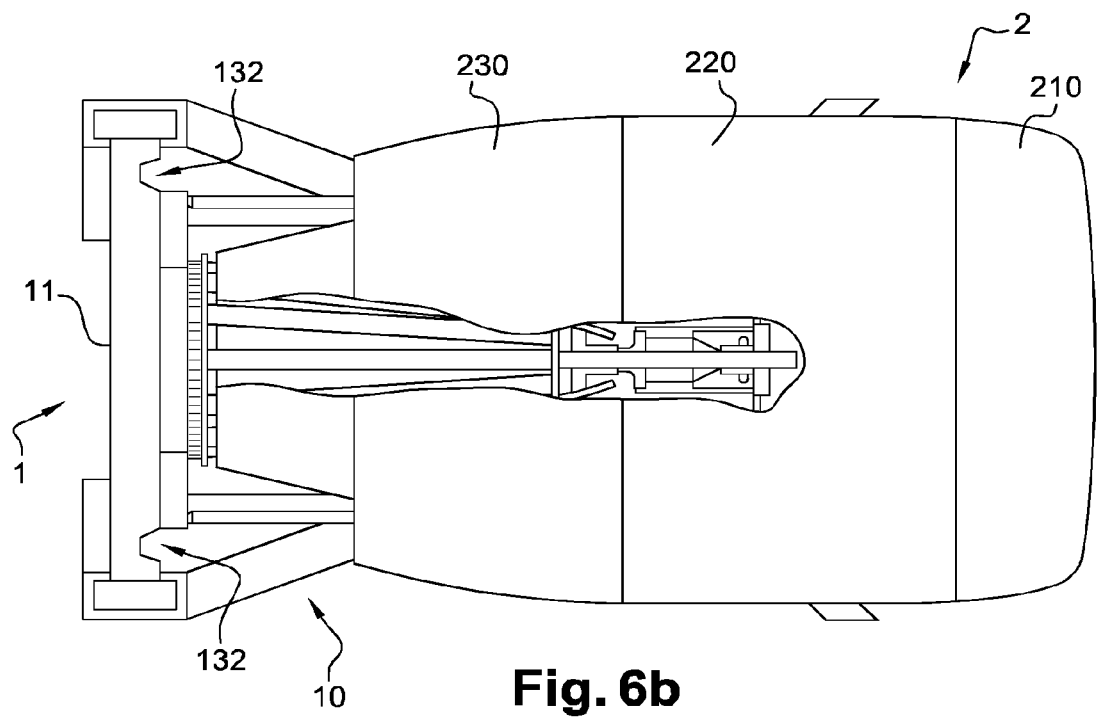

FIGS. 6a and 6b show a variant of the tooling of FIG. 3a, including a device allowing varying the height of the hooking structure 12 relative to the chassis (see arrow H in FIG. 6a), in particular in order to facilitate the work of the operators during the different painting or quality control operations. Furthermore, the support structure 12 includes clearances 132 in order to allow the passage of the ends of the fairings called beaver-tailed fairings (also called "beavertails") during the rotation of the nacelle, in case where one of the thrust reverser cowls is in the retracted position, as shown in FIG. 6b.

In the various forms of the present disclosure, it can be provided that the front segment 122 may slide (forward) relative the rear segment 121. This disposition allows releasing the space necessary for detaching (or conversely mounting) the rear section 230 of the nacelle 2 without having to previously detach the middle section 220.

Moreover, the chassis is shaped so as to provide the stability necessary for the tooling, taking into account the total mass of a nacelle. Furthermore, the chassis, and in particular the size thereof, will be advantageously provided so that the tooling may carry a half-nacelle while having sufficient lateral stability.

Although the present disclosure has been described in connection with a particular example of various forms, it is quite obvious that it is in no way limited thereto and that it comprises all the technical equivalents of the described means as well as the combinations thereof if said technical equivalents are included within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. Tooling for supporting a nacelle of an aircraft turbojet engine comprising:
   a chassis;
   a support structure extending vertically upward from the chassis; and
   a hooking structure rotatably mounted on the support structure and movable in rotation about a horizontal axis for securing the nacelle, the hooking structure defining a longitudinal axis parallel to the horizontal axis and comprising a front segment and a rear segment aligned along the longitudinal axis of the hooking structure, the front segment and the rear segment each having an elongated configuration extending along the longitudinal axis, the hooking structure further including a first device for fastening an air inlet of the nacelle, a second device for fastening a middle section of the nacelle, and a third device for fastening a rear section of the nacelle,
   wherein the second device and the third device each include a longitudinal horizontal beam extending in a direction parallel to the longitudinal axis of the hooking structure, the longitudinal horizontal beams of the second and third devices being aligned along a length direction of the longitudinal horizontal beams of the second and third devices parallel to the longitudinal axis of the hooking structure.

2. The tooling according claim 1, wherein the chassis is movable.

3. The tooling according to claim 1, further comprising an electric motor for rotatably driving the hooking structure.

4. The tooling according to claim 1 wherein a height of the hooking structure is adjustable.

5. An assembly comprising the nacelle and the tooling according to claim 1.

6. The tooling according to claim 1, wherein the longitudinal horizontal beams of the second and third devices are disposed away from the front segment and the rear segment in a radial direction of the hooking structure.

7. The tooling according to claim 1, wherein the third device includes a flange perpendicular to the longitudinal axis of the hooking structure.

8. The tooling according to claim 7, wherein the flange of the third device defines a star structure.

9. The tooling according to claim 1, wherein the first device includes a plurality of elongated fastening plates extending in a radial direction of the hooking structure.

10. The tooling according to claim 9, wherein the plurality of elongated fastening plates of the first device are disposed at a front end of the front segment.

11. The tooling according to claim 7, wherein the rear segment is rotatably mounted to the support structure and rotatable around the longitudinal axis of the hooking structure, the rear segment extending rearwardly from a rear surface of the flange of the third device.

12. The tooling according to claim 1, wherein the longitudinal horizontal beams of the second and third devices are disposed at a position higher than that of the front and rear segments as measured from the chassis.

13. The tooling according to claim 7, wherein the flange of the third device is disposed between the front segment and the rear segment, the flange having an outside diameter larger than that of the front segment.

14. The tooling according to claim 1, wherein the rear segment has a cone configuration.

15. The tooling according to claim 1, wherein the longitudinal horizontal beam of the third device is connected to the rear segment and the longitudinal horizontal beam of the second device is connected to the front segment.

16. The tooling according to claim 1, wherein the longitudinal horizontal beams of the second and third devices are disposed at a same height from the chassis.

17. The tooling according to claim 1, wherein the first device is attached to a front end of the front segment and is perpendicular to the longitudinal axis.

18. The tooling according to claim 1, wherein the front segment includes a plurality of horizontal members extending in a direction parallel to the longitudinal axis of the hooking structure.

* * * * *